No. 770,892. PATENTED SEPT. 27, 1904.
J. W. CRATES.
CUTTER MECHANISM FOR MOWING AND HARVESTING MACHINES.
APPLICATION FILED MAY 6, 1904.
NO MODEL.

Witnesses

Inventor
J. W. Crates,
By
Attorneys

No. 770,892. Patented September 27, 1904.

UNITED STATES PATENT OFFICE.

JOHN W. CRATES, OF WILLIAMS COUNTY, OHIO.

CUTTER MECHANISM FOR MOWING AND HARVESTING MACHINES.

SPECIFICATION forming part of Letters Patent No. 770,892, dated September 27, 1904.

Application filed May 6, 1904. Serial No. 206,752. (No model.)

*To all whom it may concern:*

Be it known that I, JOHN W. CRATES, a citizen of the United States, residing in the county of Williams and State of Ohio, have invented certain new and useful Improvements in Cutter Mechanism for Mowing and Harvesting Machines, of which the following is a specification.

This invention appertains to cutting mechanism of the reciprocating type designed most especially for agricultural implements of the class for mowing and harvesting the crop.

An essential object of the invention is to lessen the wear and draft; also, to provide for lifting grass, grain, or like crop that may be bent over or lying upon the ground and which ordinarily would escape harvesting.

The improvement resides chiefly in the novel formation of the guard-finger and cap-plate, the former providing for the successful application of a roller-bearing and the latter serving to lift the lying or prone crop.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1:
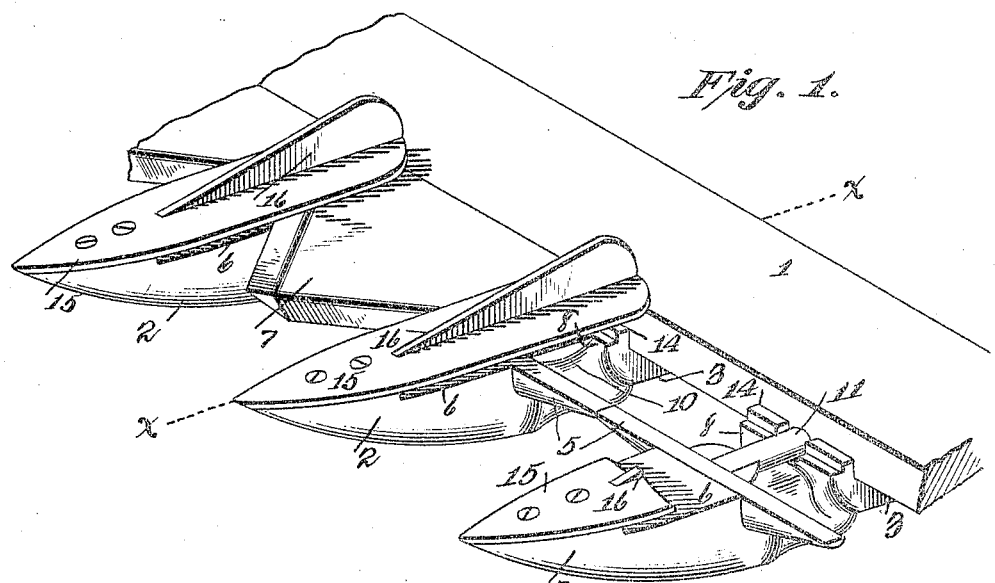
Figure 2:
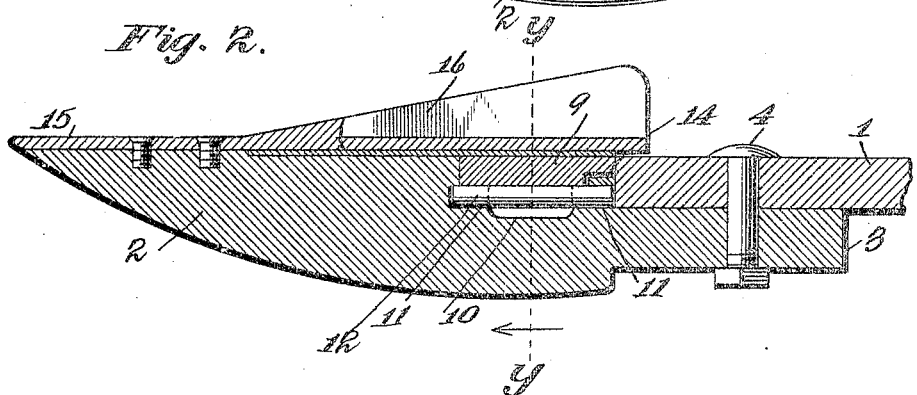
Figure 3:
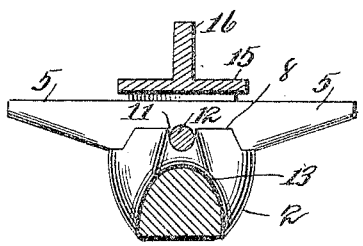

Figure 1 is a perspective view of a portion of a mower or harvester cutting mechanism embodying the invention. Fig. 2 is a section on the line X X of Fig. 1. Fig. 3 is a section on the line Y Y of Fig. 2 looking to the front as indicated by the arrows.

Corresponding and like parts are referred to in the following description and indicated in all the views of the drawings by the same reference characters.

The cutter-bar is indicated at 1 and may be of any structural type, according to the make of the machine and the special design of the cutting appliance attached thereto. The guard-fingers 2 are provided at their inner ends with shanks 3, by means of which they are secured to the bar 1 by means of bolts 4 or like fastenings. Projections 5 extend from opposite sides of each guard-finger, so as to brace the series. The projections 5 are outwardly tapered, and their upper faces are in the plane of the ledger-faces 6 of the guard-fingers over which the teeth or cutters 7 of the sickle-bar play. This construction admits of the projections 5 forming a support for the cutters 7 at points between the guard-fingers. The projections 5 touching or abutting at their ends brace the guard-fingers some distance in front of the bar 1 and prevent turning of any one of the guard-fingers upon the single fastenings 4, employed for attaching them to the cutter-bar. The upper surface of each guard-finger is cut away in the rear of the projections 5, as shown at 8, to accommodate the bar 9, to which the cutters 7 are attached. The cut-away portion 8 forms, in effect, a seat upon which the bar 9 rests. This seat is depressed intermediate of its front and rear portions, as shown at 10, to provide clearance for any matter finding its way between the bar 9 and the guard-fingers. Notches 11 are formed in the end portions of the seat 8 in longitudinal alinement and constitute bearings for the end portions of a roller 12, which supports the bar 9 and minimizes the friction between said bar and the guard-fingers. Each roller 12 is journaled at its ends, the depressed portion 10 of the seat 8 exposing the intermediate or central portion of the roller and providing clearance for any foreign matter that may tend to impair the operation of the cutter by coming between the bar 9 and the seat 8 or roller 12. The upper side of the depressed portion 10 is made rounding, as shown at 13 in Fig. 3, thereby preventing any foreign matter lodging on the part 13 either to the right or to the left. The rollers 12 are prevented from longitudinal displacement by engaging the bar 1 at their rear ends and by contact with the shoulders in front of the seats 8. Vertical displacement of the rollers is prevented by the bar 9, which closes the open sides of the notches 11. The rear portion of the seat 8 is a trifle higher than the front portion, as indicated at 14, and the lower rear portion of the bar 9 is correspondingly rabbeted to fit the elevation 14, as shown most clearly in Fig. 2.

Each guard-finger is provided with a cap-plate 15, which overlaps the sickle-bar and is secured at its front end to the guard-finger. The cap-plate 15 is of a length to overlap the front portion of the cutter-bar 1. A longitudinal rib 16 projects upward from the rear portion of each cap-plate 15, and its upper edge merges into the cap-plate near the point thereof. The rib 16 serves to strengthen the cap-plate and act as a lifter for elevating lying or prone grass, grain, or the like, so as to bring the same in position to be cut as the machine advances over the ground.

Having thus described the invention, what is claimed as new is—

In mower and harvester cutting mechanism, the combination of a guard-finger having a portion of its upper side depressed to form a seat and having the middle portion of said seat cut away or further depressed to form a clearance-space and having notches in the end portions of said seat, a roller journaled in said notches, and a sickle-bar for closing the upper side of the notches and supported upon and retaining the roller in place, substantially as set forth.

In testimony whereof I affix my signature in presence of two witnesses.

JOHN W. CRATES. [L. S.]

Witnesses:
ANDREW BUEHRU,
ANNA RUIHLEY.